US008069357B2

(12) United States Patent
Nakamura et al.

(10) Patent No.: US 8,069,357 B2
(45) Date of Patent: Nov. 29, 2011

(54) MULTI-PROCESSOR CONTROL DEVICE AND METHOD

(75) Inventors: Hiroshi Nakamura, Tokyo (JP); Masaaki Kondo, Tokyo (JP); Takashi Nanya, Kamakura (JP); Ryo Watanabe, Tokyo (JP)

(73) Assignee: Semiconductor Technology Academic Research Center, Yokohama-shi (JP)

( * ) Notice: Subject to any disclaimer, the term of this patent is extended or adjusted under 35 U.S.C. 154(b) by 838 days.

(21) Appl. No.: 12/122,267

(22) Filed: May 16, 2008

(65) Prior Publication Data

US 2008/0288796 A1 Nov. 20, 2008

(30) Foreign Application Priority Data

May 18, 2007 (JP) .................................. 2007-133131

(51) Int. Cl.
*G06F 1/26* (2006.01)
(52) U.S. Cl. ..................... 713/320; 713/300; 713/310
(58) Field of Classification Search .................. 713/300, 713/310, 320
See application file for complete search history.

(56) References Cited

U.S. PATENT DOCUMENTS

| | | | | |
|---|---|---|---|---|
| 3,395,394 A | * | 7/1968 | Cottrell, Jr. ..................... | 710/40 |
| 4,459,664 A | * | 7/1984 | Pottier et al. ..................... | 718/105 |
| 5,678,026 A | * | 10/1997 | Vartti et al. ..................... | 711/152 |
| 5,765,003 A | * | 6/1998 | MacDonald et al. ......... | 713/322 |
| 6,799,254 B2 | * | 9/2004 | Oldfield et al. ................ | 711/151 |
| 7,779,287 B2 | * | 8/2010 | Lim et al. ........................ | 713/500 |
| 2004/0230848 A1 | * | 11/2004 | Mayo et al. ..................... | 713/320 |
| 2006/0026447 A1 | * | 2/2006 | Naveh et al. .................... | 713/322 |
| 2007/0043964 A1 | * | 2/2007 | Lim et al. ........................ | 713/322 |
| 2007/0135086 A1 | * | 6/2007 | Stanford ......................... | 455/402 |
| 2007/0143514 A1 | * | 6/2007 | Kaushik et al. ................ | 710/260 |
| 2008/0263373 A1 | * | 10/2008 | Meier et al. .................... | 713/300 |
| 2009/0313489 A1 | * | 12/2009 | Gunther et al. ................. | 713/300 |
| 2010/0005323 A1 | * | 1/2010 | Kuroda et al. ................ | 713/300 |

FOREIGN PATENT DOCUMENTS

| | | | |
|---|---|---|---|
| JP | 2003337713 A | | 11/2003 |
| JP | 2007114856 A | | 5/2007 |
| WO | 2007141849 A1 | | 12/2007 |

OTHER PUBLICATIONS

Kondo, M., and H. Nakamura, "A Dynamic Voltage and Frequency Control Technique for a Chip Multiprocessor Architecture," published in IPSJ [Information Processing Society of Japan] SIG [Special Interest Group] Technical Reports, vol. 2005, No. 56, May 31, 2005, 6 pages (with English abstract).

English translation of an Office Action dated Apr. 14, 2009, issued in corresponding Japanese Application No. 2007-133131.

* cited by examiner

*Primary Examiner* — Vincent T Tran
*Assistant Examiner* — Zahid Choudhury
(74) *Attorney, Agent, or Firm* — Christensen O'Connor Johnson Kindness PLLC

(57) ABSTRACT

A multi-processor control device according to an example of the invention comprises a cooperative control unit which determines priorities of requests issued from processors to a shared resource which are used to suppress a total power consumption of the processors within a range in which performance constraints of programs executed by the processors are satisfied, and determines a frequency of each of the processors so as to suppress the total power consumption within the range in which the performance constraint of the each program is satisfied, a first control unit which issues requests from the processors to the shared resource in accordance with priorities determined by the cooperative control unit, and a second control unit which controls the frequency of each of the processors in accordance with the frequency determined by the cooperative control unit.

6 Claims, 8 Drawing Sheets

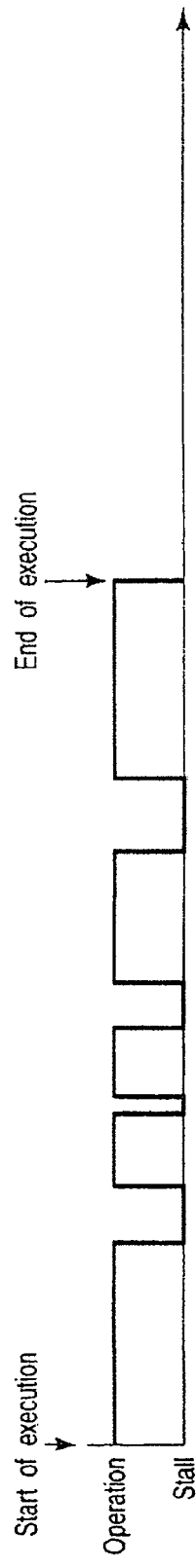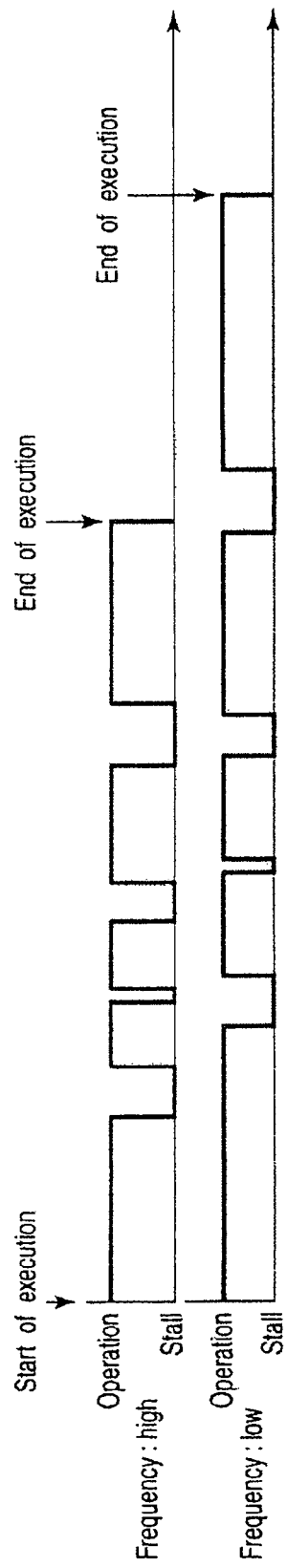

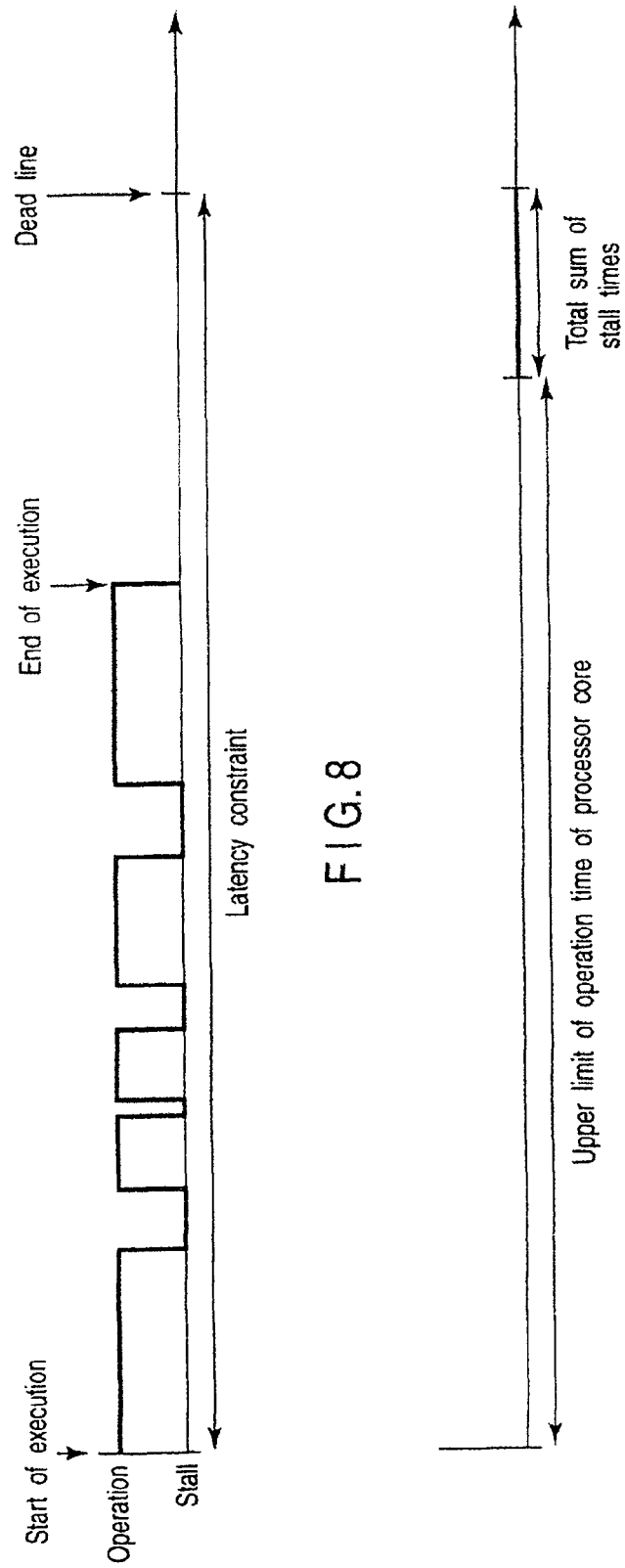

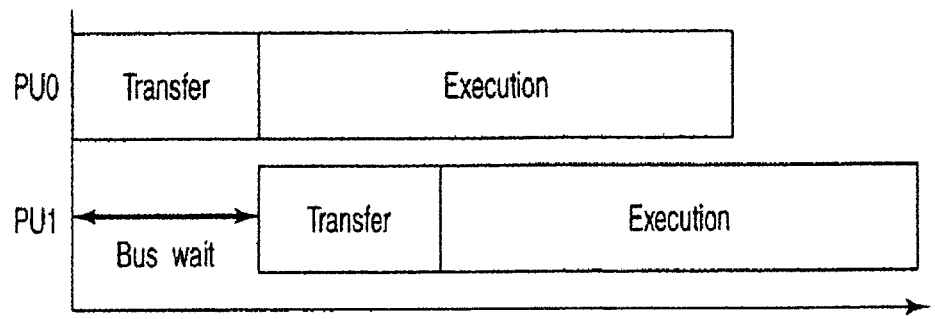
F I G. 10
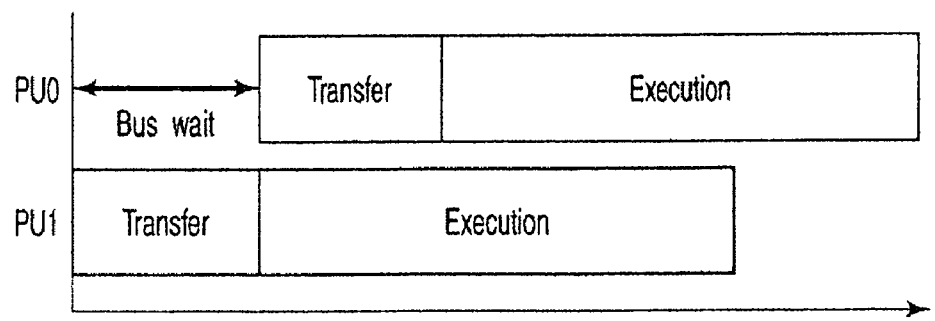
F I G. 11

| Processor Clock | 1600MHz | 1400MHz | 1200MHz | 1000MHz | 800MHz | 600MHz | 400MHz | 200MHz |
|---|---|---|---|---|---|---|---|---|
| Bus Clock | 200MHz | 200MHz | 200MHz | 200MHz | 200MHz | 200MHz | 200MHz | 200MHz |
| Processor Core Vdd | 1.502V | 1.390V | 1.278V | 1.167V | 1.055V | 0.944V | 0.832V | 0.721V |

FIG. 12

MULTI-PROCESSOR CONTROL DEVICE AND METHOD

CROSS-REFERENCE TO RELATED APPLICATIONS

This application is based upon and claims the benefit of priority from prior Japanese Patent Application No. 2007-133131, filed May 18, 2007, the entire contents of which are incorporated herein by reference.

BACKGROUND OF THE INVENTION

1. Field of the Invention

The present invention relates to a multi-processor control device and method which control a plurality of processors.

2. Description of the Related Art

As a power consumption reduction technique for a program having a constraint, there has been proposed a technique of controlling a frequency/power supply voltage so as to execute the program by using as low frequency/power supply voltage as possible within the range in which the constraint is satisfied.

a conventional technique determines a frequency/power supply voltage on the basis of the profile information of a program.

According to another conventional technique, when the constraint of a program is not satisfied, control is performed by using information obtained at the time of execution of the program to increase the frequency/power supply voltage so as to satisfy the constraint. In contrast to this, when there is a margin in terms of performance, a frequency/power supply voltage is determined by feedback control such as decreasing the frequency/power supply voltage.

A reference 1 (Masaaki Kondo and Hiroshi Nakamura, "Proposal of Dynamic Power Supply Voltage/Frequency Control Technique for CMP", IPSJ SIG Technical Reports, Vol. 2005, No. 56, published May 31, 2005, p. 25, Information Processing Society of Japan) has proposed a technique of improving fairness and achieving an improvement in performance and a reduction in power consumption or energy consumption by controlling the operating frequency and power supply voltage of each processor, instead of dividing a cache, using a dynamic power supply voltage/frequency control (DVFS: Dynamic Voltage/Frequency Scaling) technique.

In general, a CMP (Chip Multi Processor) includes a resource shared by a plurality of processor cores, e.g., a memory bus.

For this reason, the performance of a program executed by each processor core greatly depends on the properties of programs simultaneously executed by other processor cores. When a resource contention occurs, the performance of a program may greatly deteriorate.

The above conventional technique cope with this problem by only increasing the frequency/power supply voltage for a program whose performance has deteriorated, but do not perform any control in consideration of the influences of the resource contention with other programs. This may degrade energy efficiency.

BRIEF SUMMARY OF THE INVENTION

A multi-processor control device according to the first example of this invention comprises a cooperative control unit which determines priorities of requests issued from a plurality of processors to a shared resource of the plurality of processors which are used to suppress at least one of a total power consumption and a total energy consumption of the plurality of processors within a range in which performance constraints of programs executed by the plurality of processors are satisfied, and determines at least one of a frequency and a power supply voltage of each of the plurality of processors so as to suppress the at least one of the total power consumption and the total energy consumption within the range in which the performance constraint of the each program is satisfied, a first control unit which issues requests from the plurality of processors to the shared resource in accordance with priorities determined by the cooperative control unit, and a second control unit which controls at least one of the frequency and the power supply voltage of each of the plurality of processors in accordance with the at least one of the frequency and the power supply voltage determined by the cooperative control unit.

A multi-processor control method according to the second example of this invention comprises executing a control algorithm which determines priorities of requests issued from a plurality of processors to a shared resource of the plurality of processors which are used to suppress at least one of a total power consumption and a total energy consumption of the plurality of processors within a range in which performance constraints of programs executed by the plurality of processors are satisfied, and at least one of a frequency and a power supply voltage of each of the plurality of processors, and issuing requests from the plurality of processors to the shared resource in accordance with priorities determined by the control algorithm and controlling the at least one of the frequency and the power supply voltage of each of the plurality of processors in accordance with the at least one of the frequency and the power supply voltage determined by the control algorithm.

BRIEF DESCRIPTION OF THE SEVERAL VIEWS OF THE DRAWING

FIG. 6 is a timing chart showing an example of the relationship between an operation state and stall state of a processor core;

FIG. 7 is a timing chart showing an example of temporal changes of program execution states from a start of execution to an end of execution at different frequencies;

FIG. 8 is a timing chart showing an example of the relationship between a latency constraint and the time from the start of execution of a program to the end of execution of the program;

FIG. 9 is a view showing an example of the relationship between an upper limit of an operation time and a total stall time of a processor core;

FIG. 10 is a view showing an example of a state in which priority is given to a processor core $PU_0$ over a processor core $PU_1$;

FIG. 11 is a view showing an example of a state in which priority is given to the processor core $PU_1$ over the processor core $PU_0$;

FIG. 12 is a table showing an example of a result obtained by linearly approximating the relationship between a voltage and frequency of a commercially available processor.

DETAILED DESCRIPTION OF THE INVENTION

Figure 1:
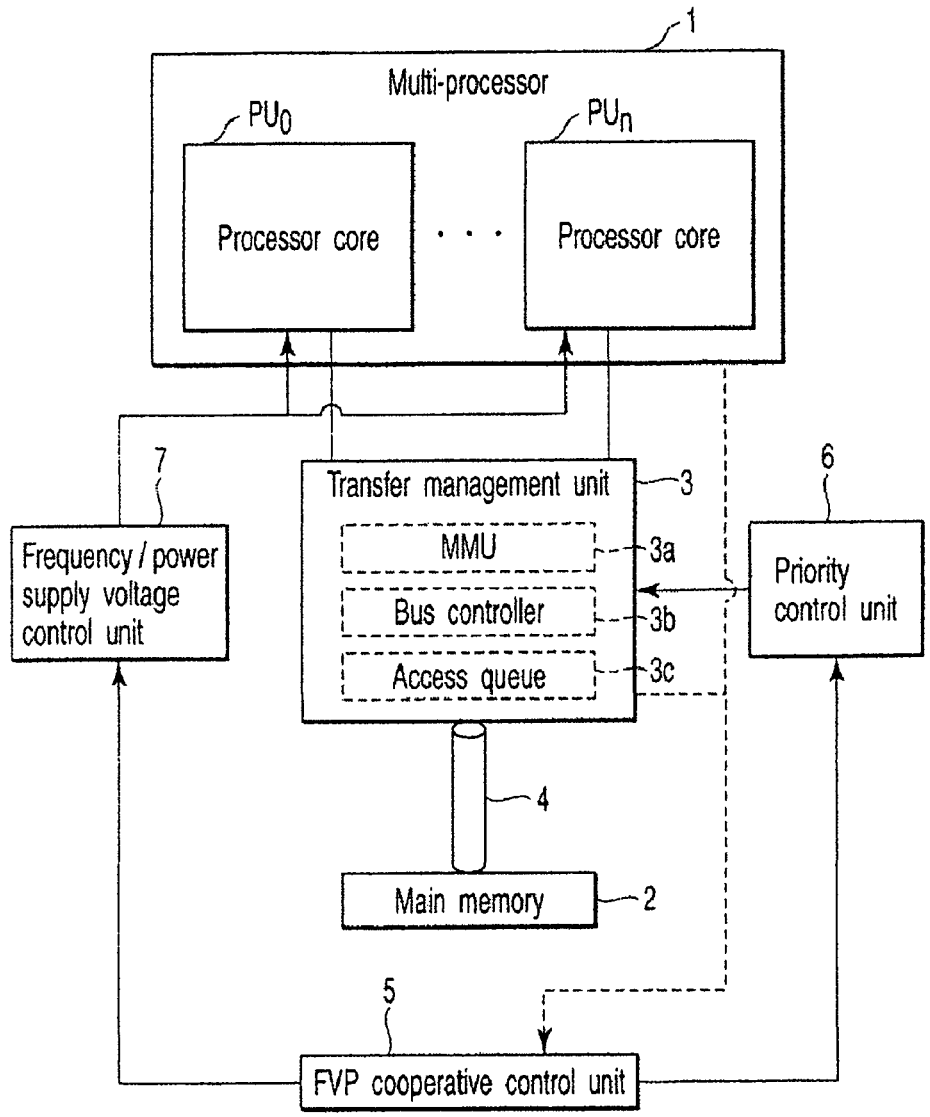
FIG. 1 is a block diagram showing an example of the arrangement of a multi-processor control device according to the first embodiment of a present invention.

Embodiments of the present invention will be described below with reference to the views of the accompanying drawing. Note that the same reference numerals denote parts having similar functions in the following views of the drawing, and a repetitive description will be omitted.

First Embodiment

This embodiment exemplifies a device which controls a chip multi processor (CMP) having a plurality of processor cores mounted on one chip. However, a control target of this control device is not limited to a CMP. For example, a multi-processor system comprising a plurality of chips can be a control target.

This embodiment exemplifies a multi-processor control device which suppresses at least one of power consumption and energy consumption by modeling an influence of shared resource contention on performance in consideration of the influence of the shared resource contention between programs executed by the respective processor cores. The following description exemplifies a case in which power consumption is suppressed. It is, however, possible to suppress energy consumption by using a similar control technique.

This embodiment can improve a power consumption suppressing effect by adjusting the influence of shared resource contention on performance by priority control. For this purpose, a multi-processor according to this embodiment controls priority and a frequency/power supply voltage so as to minimize the overall power consumption by cooperatively performing priority control and frequency/power supply voltage control.

FIG. 1 is a block diagram showing an example of the arrangement of a multi-processor control device according to this embodiment.

A multi-processor 1 has a plurality of processor cores $PU_0$ to $PU_n$ mounted on one chip. The programs to be executed by the processor cores $PU_0$ to $PU_n$ have performance constraints (e.g., a latency (real time) constraint, i.e., that the upper limit of an execution time is set in advance, e.g., that a given program must be complete within a specific number of seconds).

The processor cores $PU_0$ to $PU_n$ and a main memory 2 are connected to each other via a transfer management unit 3 and a memory bus 4. The transfer management unit 3 comprises an MMU (Memory Management Unit) 3a, a bus controller 3b, and an access queue 3c.

In this embodiment, the multi-processor control device for suppressing power consumption in the multi-processor 1 comprises the access queue 3c, an FVP cooperative control unit 5, a priority control unit 6, and a frequency/power supply voltage control unit 7.

The multi-processor control device can individually control the frequencies and power supply voltages of the processor cores $PU_0$ to $PU_n$ of the multi-processor 1. The multi-processor control device can discriminate which one of the processor cores $PU_0$ to $PU_n$ has issued an access request to the main memory 2, and the access request is controlled in accordance with a priority corresponding to the processor core which has issued the access request. Assume that in this embodiment, priorities correspond to the ratios at which wait times are allocated to the processor cores $PU_0$ to $PU_n$ when access requests from the processor cores $PU_0$ to $PU_n$ contend with each other.

The multi-processor control device controls the frequencies/power supply voltages of the processor cores $PU_0$ to $PU_n$ in cooperation with the priorities of requests.

The processor cores $PU_0$ to $PU_n$ are connected to the memory bus 4 and the main memory 2 as shared resources via the transfer management unit 3.

In order to execute programs (applications or processes) while satisfying performance constraints and suppress the overall power consumption, the FVP cooperative control unit 5 executes a cooperative control between the priorities of requests from the processor cores $PU_0$ to $PU_n$ and frequencies/power supply voltages in cooperation with each other and supplies control signals to the priority control unit 6 and the frequency/power supply voltage control unit 7 on the basis of the contention state of the memory bus 4 and information of the programs operating in the processor cores $PU_0$ to $PU_n$. The FVP cooperative control unit 5 decreases at least one of the frequency and power supply voltage of a processor core, whose priority of a request has been increased, as compared with a case in which priority control is not performed. Increasing the priority can decrease the frequency and power supply voltage as compared with a case in which priority control is not performed. This can achieve a reduction in power consumption.

The priority control unit 6 controls the priority of an access request to the main memory 2 on the basis of a control signal received from the FVP cooperative control unit 5.

The frequency/power supply voltage control unit 7 controls at least one of the frequency and power supply voltage of each of the processor cores $PU_0$ to $PU_n$ (only the frequency, only the power supply voltage, or both the frequency and the power supply voltage) on the basis of a control signal received from the FVP cooperative control unit 5.

A control method performed by the multi-processor control device according to this embodiment will be described below.

Figure 2:
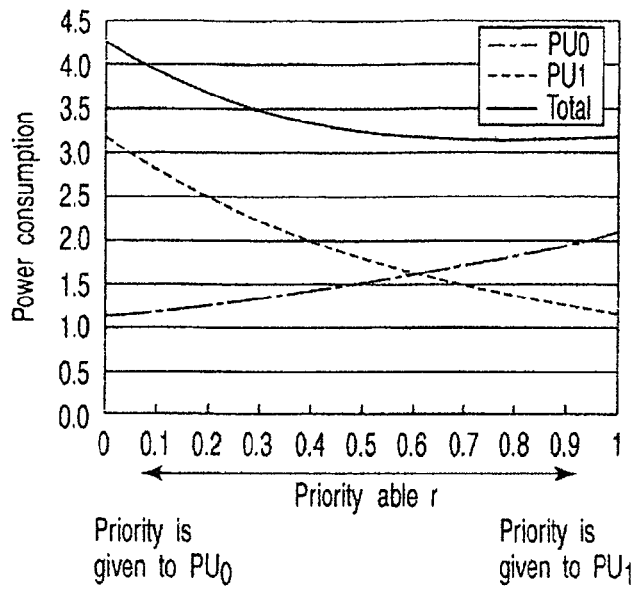
FIG. 2 is a graph showing an example of the relationship between a power consumption of a processor core $PU_0$, a power consumption of a processor core $PU_1$, a total power consumption of processor cores $PU_0$ and $PU_1$, and priorities of requests in a state in which performance constraints of programs are satisfied.

FIG. 2 is a graph showing an example of the relationship between the power consumption of the processor core $PU_0$, the power consumption of the processor core $PU_1$, the total power consumption of the processor cores $PU_0$ and $PU_1$, and the priorities of requests in a state in which the performance constraints of programs are satisfied.

Referring to FIG. 2, priorities represent the allocation ratios of wait times between requests from the processor cores $PU_0$ and $PU_1$.

A priority of 0 indicates a level at which a request from the processor core $PU_0$ takes precedence over all requests from the processor core $PU_1$.

A priority of 0.5 indicates a level at which the wait times allocated to requests from the processor cores $PU_0$ and $PU_1$ are the same.

A priority of 1 indicates a level at which a request from the processor core $PU_1$ takes precedence over all requests from the processor core $PU_0$.

As the priority approaches 0, a higher priority is given to a request from the processor core $PU_0$ than to a request from the processor core $PU_1$.

In contrast, as the priority approaches 1, a higher priority is given to a request from the processor core $PU_1$ than to a request from the processor core $PU_0$.

If, for example, the priority of the processor core $PU_0$ is higher than that of the processor core $PU_1$, a request from the processor core $PU_0$ to a shared resource takes precedence over a request from the processor core $PU_1$. This makes it possible to execute a program in the processor core $PU_0$ more efficiently than a program in the processor core $PU_1$. Accordingly, the frequency/power supply voltage of the processor core $PU_0$ can be decreased within the range in which the performance constraint is satisfied. If, therefore, the priority of the processor core $PU_0$ is high, the power consumption of the processor core $PU_0$ can be reduced.

If the priority of the processor core $PU_1$ is lower than that of the processor core $PU_0$, a request from the processor core $PU_0$ to a shared resource takes precedence over a request from the processor core $PU_1$. For this reason, it is difficult to execute a program in the processor core $PU_1$ more efficiently than a program in the processor core $PU_0$. Accordingly, the frequency/power supply voltage of the processor core $PU_1$ needs to be increased to satisfy the performance constraint. If, therefore, the priority of the processor core $PU_1$ is low, the power consumption of the processor core $PU_1$ increases.

Referring to FIG. 2, a program executed by the processor core $PU_1$ is higher in emergence than a program executed by the processor core $PU_0$, and the processor core $PU_1$ requires a higher processing speed than the processor core $PU_0$ and consumes large power. For this reason, the rate of change in the relationship between the priority and power consumption of the processor core $PU_1$ is higher than that of the processor core $PU_0$.

It is obvious from FIG. 2 that setting the priority of the processor core $PU_0$ to be higher than that of the processor core $PU_1$ can suppress the total power consumption.

In this embodiment, when access requests from the processor cores $PU_0$ to $PU_n$ to a shared resource contend with each other, higher priorities are given to programs with higher emergences. This shortens the duration of the wait state of a processor core, for the shared resource, which is to execute a program with a higher priority, and hence can decrease the speed (frequency/power supply voltage) of the processor core. Note that a frequency (=processing speed) is almost proportional to a power supply voltage. The power consumption is approximately proportional to the square of a power supply voltage.

In the state shown in FIG. 2, the total power consumption of the processor cores $PU_0$ and $PU_1$ can be suppressed by decreasing the priority of the processor core $PU_0$ on the lower power consumption side, and increasing the priority of the processor core $PU_1$ on the higher power consumption side, while suppressing the frequency/power supply voltage within the range in which the performance constraints of programs in the processor cores $PU_0$ and $PU_1$ are satisfied.

The priority with which the total power consumption is minimum is used as the "optimal priority" for control. The priority control unit 6 controls the actual issuance of requests so as to set this optimal priority.

A concrete example of a control algorithm which controls priorities and frequencies/power supply voltages will be described below. Note that this control algorithm is an example, and another technique can be used.

Figure 3:
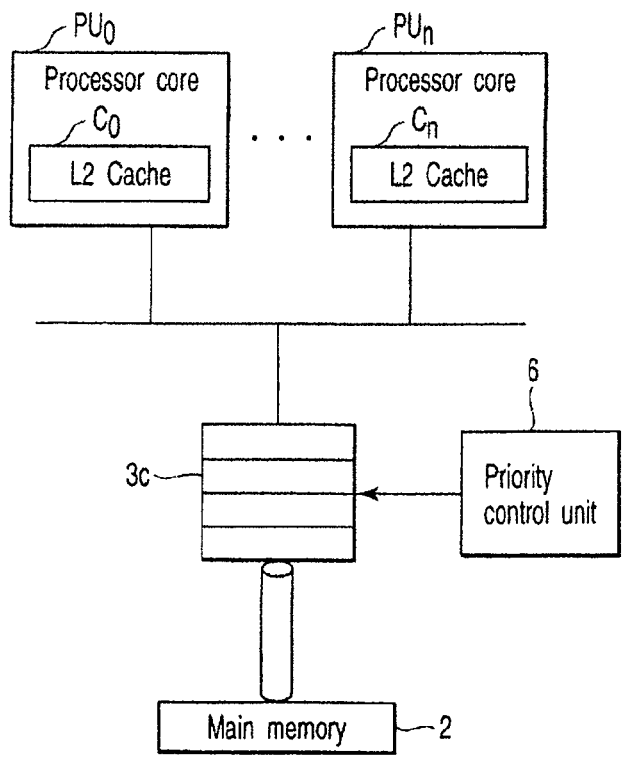
FIG. 3 is a block diagram showing an example of a request queue.

As shown in, for example, FIG. 3, when there is a request queue 3c which holds memory requests from the processor cores $PU_0$ to $PU_n$, the priorities of access to a shared resource can be controlled by, for example, a technique of permitting the request queue 3c issue a request which have been issued from a processor core with a high priority with precedence over a given number of requests which have been issued from other processor cores with lower priorities.

The influences of shared resource contentions on the performances of the processor cores $PU_0$ to $PU_n$ can be formulated by constructing a performance prediction model using, as parameters, performance constrains on the respective programs (e.g., latency constraints), the numbers of times of access from the respective programs to the shared resource, the numbers of times of instruction execution of the respective programs, the performance of the shared resource (e.g., a wait time based on shared resource access at the time of independent execution), and the like. This makes it possible to obtain a priority for the shared resource with which the overall power consumption of the multi-processor 1 is minimized.

Priorities and the frequencies/power supply voltages of the processor cores $PU_0$ to $PU_n$ can be controlled by, for example, a technique using time intervals.

Figure 4:
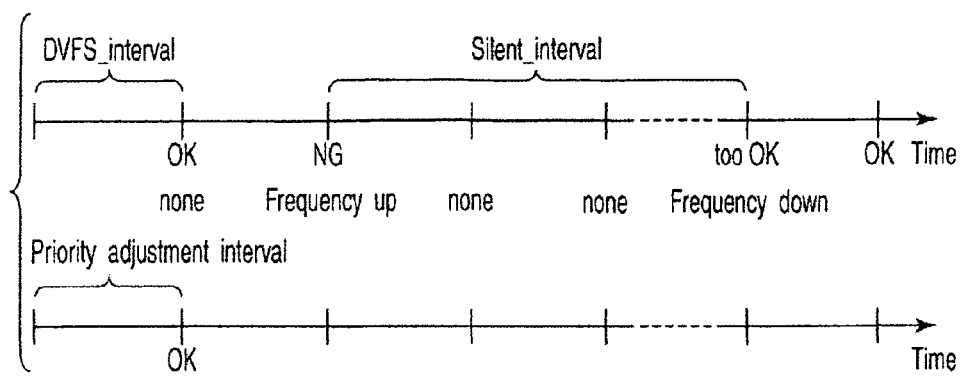
FIG. 4 is a view showing an example of a control technique of adjusting a frequency/power supply voltage at each frequency/power supply voltage adjustment interval and adjusting a priority at each priority adjustment interval.

FIG. 4 is a view showing an example of a control technique of adjusting a frequency/power supply voltage at each frequency/power supply voltage adjustment interval (DVFS_interval) and adjusting a priority at each priority adjustment interval.

The FVP cooperative control unit 5 checks the performances of programs in the processor cores $PU_0$ to $PU_n$ at each frequency/power supply voltage adjustment interval to monitor whether the performance required to satisfy a performance constraint is achieved. The FVP cooperative control unit 5 then executes feedback control, e.g., increasing at least one of the frequency and the power supply voltage of a processor core which is to execute a program for which it is determined that the performance has not been achieved.

The FVP cooperative control unit 5 checks the progress state of a program at each frequency/power supply voltage adjustment interval. If the program seems to be complete earlier than the time based on the performance constraint, the FVP cooperative control unit 5 decreases at least one of the frequency and the power supply voltage (by, for example, −1). If the progress state indicates that the program seems not to be complete within the time based on the performance constraint, the FVP cooperative control unit 5 increases at least one of the frequency and the power supply voltage (by, for example, +1). Once the frequency/power supply voltage is changed, the frequency/power supply voltage is not changed in Silent_interval.

The FVP cooperative control unit 5 monitors the actual state of contention between requests from the processor cores $PU_0$ to $PU_n$ to the shared resource at priority adjustment intervals, and executes feedback control on priorities so as to set priorities determined as optimal.

That is, the FVP cooperative control unit 5 compares the optimal priorities (optimal wait time allocations) determined from FIG. 2 and actual wait time allocations, and performs control to set priorities that make the actual wait time allocations the optimal priorities.

In general, when a program with a performance constraint to be satisfied at minimum is to be executed, power consumption can be suppressed by executing the program by using a low frequency/power supply voltage within the range in which the performance constraint is satisfied.

In a conventional multi-processor, when access contention for a shared bus resource such as a memory bus occurs, the performance of the program deteriorates. In this case, in order to compensate for this performance deterioration, it is necessary to operate the processor core at a high frequency/power supply voltage, resulting in an increase in power consumption.

In contrast to this, in this embodiment, the FVP cooperative control unit 5 properly controls the usage rate of a shared resource by priority control in accordance with the states of programs executed by the processor cores $PU_0$ to $PU_n$, and also adjusts the frequencies/power supply voltages of the processor cores $PU_0$ to $PU_n$ in accordance with the priority control. With this operation, the overall power consumption of the multi-processor 1 is suppressed while the performance constraints of the programs are satisfied.

The effects obtained by using the above multi-processor control device will be described below.

In this embodiment, even when a contention of access requests to a shared resource occurs, a deterioration in the performance of a processor core with high power consumption can be reduced by setting the priority of an access request from the processor core with high power consumption to the shared resource to be higher than the priority of an access request from a processor core with low power consumption to the shared resource. This makes it possible to suppress the overall power consumption of the multi-processor 1.

This embodiment can further reduce the overall power consumption of the multi-processor 1 as compared with the case in which frequency/power supply voltage control and priority control are independently performed.

The multi-processor 1 is expected as an architecture which can achieve both a reduction in power consumption and an increase in performance, and is regarded as the mainstream among high-performance processors and embedded processors. The technique significance of the control according to this embodiment is very high, which can further promote a reduction in the power consumption of the multi-processor 1 while satisfying the performance constraints of programs. This technique has a high impact from the viewpoint of business.

Second Embodiment

This embodiment exemplifies a control algorithm which controls priorities and frequencies/power supply voltages by a scheme different from that in the first embodiment.

According to a performance prediction model, when the frequencies of processor cores $PU_0$ to $PU_n$ become equal to each other, the overall power consumption is minimized.

In this embodiment, therefore, an FVP cooperative control unit 5 controls priorities such that all the frequencies of the processor cores $PU_0$ to $PU_n$ include within a target range (more preferably become equal to each other).

Consider, for example, the two processor cores $PU_0$ and $PU_1$. If the frequency of the processor core $PU_0$ is higher than that of the processor core $PU_1$, the FVP cooperative control unit 5 increases the priority of the processor core $PU_0$.

In contrast, if the frequency of the processor core $PU_1$ is higher than that of the processor core $PU_0$, the FVP cooperative control unit 5 increases the priority of the processor core $PU_1$.

Using such a control algorithm can suppress the overall power consumption of the multi-processor 1 as in the first embodiment.

Third Embodiment

This embodiment exemplifies the performance prediction model in the first and second embodiments.

Figure 5:
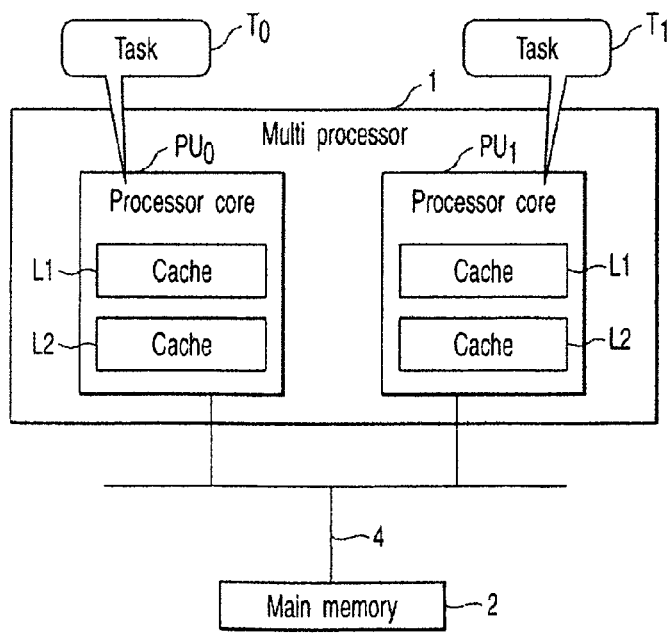
FIG. 5 is a block diagram showing an example of the relationship between a multi-processor and a shared resource according to the third embodiment of the present invention.

For simplification, a multi-processor (chip multi processor) 1 on which two processor cores $PU_0$ and $PU_1$ are mounted as shown in FIG. 5 will be described.

The processor cores $PU_0$ and $PU_1$ respectively incorporate caches L1 and L2, and share a memory bus 4 and a main memory 2. The processor cores $PU_0$ and $PU_1$ respectively execute independent programs $T_0$ and $T_1$. The processor cores $PU_0$ and $PU_1$ have latency constraints as performance constraints.

Access contention for the memory bus 4 will be described below.

As shown in FIG. 6, a processor core which is executing a program takes two states, i.e., a state (operation state) in which an instruction is being executed and a state (stall state) in which access to the cache L2 fails, and the processor core is stalled to wait for the corresponding data.

When the frequency/power supply voltage of a processor core is changed, the operation time required to complete the execution of an instruction changes, as shown in FIG. 7. Since the frequency/power supply voltage of the shared memory bus 4 is constant, the stall time is invariable.

FIG. 8 is a timing chart showing the relationship between a latency constraint and the time from the start of execution of a program to the end of execution of the program. When a program having a latency constraint is to be executed, the time from the start of execution of the program to the end of execution of the program needs to fall within the latency constraint.

As shown in FIG. 9, a frequency/power supply voltage which is selected such that the operation time from the start of execution of a program to the end of execution of the program becomes equal to (latency constraint−stall time) is the lowest frequency/power supply voltage (which minimizes power consumption) within the range in which the performance constraint is satisfied.

Since the performance of a processor core at the time of operation is proportional to a frequency, the following expression holds for frequency selection:

$$\text{frequency} \propto \frac{\text{number of instructions of program}}{(\text{latency constraint} - \text{stall time})} \quad (1)$$

Let $L_i$ be the latency constraint of a program $T_i$, $m_i$ be the number of times of cache errors against the cache L2 during the execution of the program $T_i$ (=the number of times of access to a shared resource), $s_i$ be the length of the stall time during the execution of the program $T_i$ (=the wait time due to shared resource access at the time of independent execution of the program), $l_B$ be the time required for the shared resource to transfer data corresponding to one cache error against the cache L2 (=the shared resource occupied time per cache error against the cache L2), and $I_i$ be the number of times of execution of the program $T_i$.

A case in which a processor core $PU_i$ operates independently, i.e., there is no access contention will be described first. In this case, the effective operation time $t_i$ of the processor core $PU_i$ is given by $$t_i = L_i - s_i \quad (2)$$

That is, it suffices to set the frequency/power supply voltage of the processor core $PU_i$ so as to process all the instructions of the program $T_i$ in a time $t_i$.

A frequency $f_i$ to be set from the processor core $PU_i$ is represented by $$f_i = c\frac{I_i}{t_i} \tag{3}$$

where c is a constant.

Letting $V_i$ be the power supply voltage required to operate the processor core $PU_i$ at the frequency $f_i$, an energy $e_i$ to be consumed when the processor core $PU_i$ executes one instruction is given by $$e_i = kV_i^2 \tag{4}$$

where k is a constant.

An average power consumption $P_i$ (energy/time) of the processor core $PU_i$ can therefore be obtained by $$P_i = \frac{I_i}{L_i}e_i = \frac{kI_iV_i^2}{L_i} \tag{5}$$

A case in which the processor cores $PU_0$ and $PU_1$ are simultaneously operated will be described next.

Assume that a cache error against the cache L2 has occurred on the processor core $PU_0$. In this case, when the processor core $PU_0$ tries to acquire data from the main memory, the probability at which the shared resource is occupied by the processor core $PU_1$ (the probability at which a conflict occurs) is given by $$P_0 = \frac{m_1 l_B}{L_1} \tag{6}$$

Assume that the temporal distribution of use of the shared resource by the processor core $PU_1$ is uniform. In this case, the expected value of the time by which transfer by the processor core $PU_0$ is waited at the occurrence of a conflict is represented by $$E_w = \frac{1}{2}l_B \tag{7}$$

Therefore, the expected value of the stall time of the processor core $PU_0$ per cache error against the cache L2 by the processor core $PU_0$, which increases due to contention with the processor core $PU_1$ is represented by $$P_0 E_w = \frac{m_1 l_B^2}{2L_1} \tag{8}$$

In this case, the effective operation time of the processor core $PU_0$ changes from $t_0$ to $t_0'$ represented by $$t_0' = t_0 - m_0 \frac{m_1 l_B^2}{2L_1}. \tag{9}$$

A frequency $f_0'$ and a power supply voltage $V_0'$ are determined by the time $t_0'$ as in the case of independent operation.

For the processor core $PU_1$, $t_1'$, $f_0'$, and $V_0'$ are determined in the same manner as described above. Therefore, a power consumption $P_i'$ of each processor core in the presence of a contention is given by $$P_i' = \frac{I_i}{L_i}e_i' = \frac{kI_iV_i'^2}{L_i} \tag{10}$$

Changes in power with the execution of priority control on a shared resource will be described next.

The total stall time which increases due to a contention when the processor cores $PU_0$ and $PU_1$ are simultaneously operated is represented as a value per unit time by $$l_{total} = \frac{m_0}{L_0}\frac{m_1 l_B^2}{2L_1} + \frac{m_1}{L_1}\frac{m_0 l_B^2}{2L_0} = \frac{m_0 m_1 l_B^2}{L_0 L_1} \tag{11}$$

In this case, $l_{total}$ does not change even when priority control is performed.

As will be described below, however, the ratio of increases in stall time (performance penalty) due to contention between the respective processor cores can be changed.

Assume that the two processor cores $PU_0$ and $PU_1$ simultaneously try to use a shared resource when priority control is performed. In this case, when priority is given to the processor core $PU_0$, the state shown in FIG. 10 is set.

When priority is given to the processor core $PU_1$, the state shown in FIG. 11 is set.

As shown in FIGS. 10 and 11, although the total sum of wait times is invariable, the wait time allocations can be changed.

Assume that there is an ideal priority control unit, which controls the ratio of performance penalties given to the processor cores $PU_0$ and $PU_1$ to the value given by equation (12) (when r=0, priority is always given to transfer by the processor core $PU_0$, and when r=1, priority is always given to transfer by the processor core $PU_1$):

$$PU_0:PU_1=r:(1-r)(0 \leq r \leq 1) \tag{12}$$

In this case, the effective operation time $t_i'$ of each processor core is represented as the function of r as follows:

$$t'_0 = t_0 - L_0 r l_{total} \tag{13}$$

$$t'_1 = t_1 - L_1(1-r)l_{total} \tag{14}$$

Therefore, a total power consumption $P_{total}$ (=$P_o'$+$P_1'$) of the multi-processor 1 is also the function of r, and changes in accordance with priority control.

In the following description, in the above performance prediction model, the value of r which minimizes the total power consumption $P_{total}$ of the multi-processor 1 is generally determined as a unique value, which is minimized when $dP_{total}/dr$ given below is 0:

$$\begin{aligned}\frac{d}{dr}P_{total} &= \frac{I_0}{L_0}\frac{d}{dr}e_0' + \frac{I_1}{L_1}\frac{d}{dr}e_1' \\ &= l_{total}\left\{n\left(\frac{I_0}{t_0'}\right)^{n+1} + (n-1)\left(\frac{I_0}{t_0'}\right)^n + \ldots + \left(\frac{I_0}{t_0'}\right)^2 - \right. \\ &\quad \left. n\left(\frac{I_1}{t_1'}\right)^{n+1} - (n-1)\left(\frac{I_1}{t_1'}\right)^n - \ldots - \left(\frac{I_1}{t_1'}\right)^2\right\}\end{aligned} \tag{15}$$

This leads to $I_0/t_0'=I_1/t_1'$, i.e., $f_0'=f_1'$, as a condition for minimum power consumption. Equalizing the frequencies required by the respective processor cores to satisfy constraints will minimize the power consumption. In this case, the value of r is given by $$r_{min} = \frac{I_1 t_0 - I_0 t_1 + I_0 L_1 l_{total}}{(I_0 L_1 + I_1 L_0) l_{total}} \quad (16)$$

The value $r_{min}$ allows to obtain optimal priorities=optimal allocation ratio of wait times.

Fourth Embodiment

This embodiment exemplifies evaluation performed when the control algorithm for priorities and frequencies/power supply voltages which has been described in the first embodiment (to be referred to as the first control algorithm hereinafter) and when the control algorithm for priorities and frequencies/power supply voltages which has been described in the second embodiment (to be referred to as the second control algorithm hereinafter).

FIG. 12 is a table showing an example of the result obtained by linearly approximating the relationship between the voltage and frequency of a commercially available processor.

Figure 13:
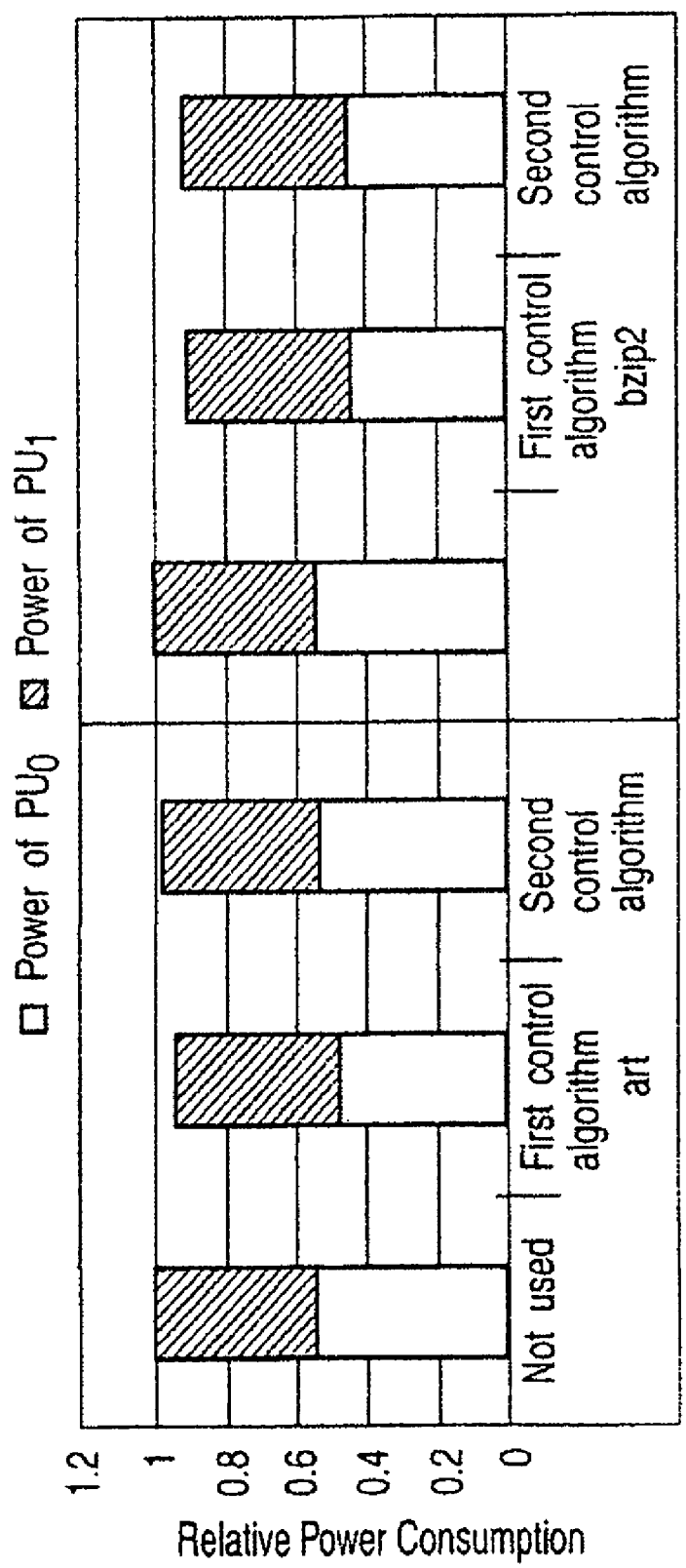
FIG. 13 is a graph showing an example of evaluation made when the multi-processor control device according to the first embodiment is used and when a multi-processor control device according to the second embodiment is used.

FIG. 13 is a graph showing an example of the states of power consumption when the first and second control algorithms are not used, when the first control algorithm is used, and when the second control algorithm is used.

FIG. 13 shows a case in which a processor core $PU_0$ executes an H264 decoder, and the processor core $PU_1$ executes another program "art" or "bzip2".

As is obvious from FIG. 13, the power consumption can be suppressed by about 10% when the first or second control algorithm is used than when neither the first nor second control algorithm is used.

Note that this evaluation value changes depending on degrees of constraints and variations in load on each of the processor cores $PU_0$ and $PU_1$.

Each embodiment described above can be variously modified within the spirit and scope of the invention.

For example, shared resources include various types of access destinations shared by the processor cores $PU_0$ to $PU_n$, e.g., various types of memories, banks, PCI buses, displays, and interfaces.

The FVP cooperative control unit 5 can be implemented by software. It suffices to implement the function of the FVP cooperative control unit 5 by using at least one processor core.

In each embodiment described above, priority adjustment is implemented by making a given request take precedence over other request in the access queue 3c. However, priority adjustment can be implemented by other techniques. For example, it suffices to provide a request storage unit for each processor core and make each request storage unit issue a request to a shared resource in accordance with the control timing of the priority control unit 6.

As a control algorithm for priories and frequencies/power supply voltages, another algorithm can be used.

In each embodiment described above, various constituent elements can be freely combined or separated. For example, the FVP cooperative control unit 5, priority control unit 6, frequency/power supply voltage control unit 7 can be arbitrarily combined. The FVP cooperative control unit 5, priority control unit 6, and frequency/power supply voltage control unit 7 can be combined into one unit.

What is claimed is:

1. A multi-processor control device comprising:
   a cooperative control unit which determines priorities of requests issued from a plurality of processors to a shared resource of the plurality of processors which are used to suppress at least one of a total power consumption and a total energy consumption of the plurality of processors within a range in which performance constraints of programs executed by the plurality of processors are satisfied, and determines at least one of a frequency and a power supply voltage of each of the plurality of processors so as to suppress the at least one of the total power consumption and the total energy consumption within the range in which the performance constraint of the each program is satisfied;
   a first control unit which issues requests from the plurality of processors to the shared resource in accordance with priorities determined by the cooperative control unit; and
   a second control unit which controls at least one of the frequency and the power supply voltage of each of the plurality of processors in accordance with the at least one of the frequency and the power supply voltage determined by the cooperative control unit,
   wherein the cooperative control unit sets a priority of a request from a processor which executes a program with high emergence to be higher than a priority of a request from a processor which executes a program with low emergence, and sets at least one of a frequency and a power supply voltage of a processor whose priority of a request has been increased to be lower than that when no priority control is performed.

2. A device according to claim 1, wherein the cooperative control unit monitors an actual state of contention from the plurality of processors to the shared resource and executes feedback control to make match the actual state of contention with the priorities,
   monitors a progress state of the each program, and
   performs feedback control for each processor which executes the each program so as to decrease at least one of a frequency and a power supply voltage when a progress state of the each program comes to an end earlier than a prediction result predicted on the basis of a performance prediction model and increase the at least one of the frequency and the power supply voltage when the progress state of the each program is expected not to be in time with the prediction result.

3. A device according to claim 1, wherein the cooperative control unit controls priorities of requests from the plurality of processors such that each of frequencies of the plurality of processors is included within a target range.

4. A multi-processor control method comprising:
   executing a control algorithm which determines priorities of requests issued from a plurality of processors to a shared resource of the plurality of processors which are used to suppress at least one of a total power consumption and a total energy consumption of the plurality of processors within a range in which performance constraints of programs executed by the plurality of processors are satisfied, and at least one of a frequency and a power supply voltage of each of the plurality of processors; and
   issuing requests from the plurality of processors to the shared resource in accordance with priorities determined by the control algorithm and controlling the at least one of the frequency and the power supply voltage of each of the plurality of processors in accordance with the at least one of the frequency and the power supply voltage determined by the control algorithm, the control algorithm sets a priority of a request from a processor which executes a program with high emergence to be higher than a priority of a request from a processor which executes a program with low emergence, and sets at least one of a frequency and a power supply voltage of a processor whose priority of a request has been increased to be lower than that when no priority control is performed.

5. A method according to claim 4, wherein the control algorithm monitors an actual state of contention from the plurality of processors to the shared resource and executes feedback control to make match the actual state of contention with the priorities, monitors a progress state of the each program, and performs feedback control for each processor which executes the each program so as to decrease at least one of a frequency and a power supply voltage when a progress state of the each program comes to an end earlier than a prediction result predicted on the basis of a performance prediction model and increase the at least one of the frequency and the power supply voltage when the progress state of the each program is expected not to be in time with the prediction result.

6. A method according to claim 4, wherein the control algorithm controls priorities of requests from said plurality of processors such that each of frequencies of the plurality of processors is included falls within a target range.

* * * * *